United States Patent
Wang et al.

(10) Patent No.: US 12,276,527 B1
(45) Date of Patent: Apr. 15, 2025

(54) DEVICE AND METHOD FOR MEASURING LEVELNESS OF TOP COVER OF REACTOR PRESSURE VESSEL

(71) Applicant: JIANGSU NUCLEAR POWER CORPORATION, Lianyungang (CN)

(72) Inventors: Wenfa Wang, Lianyungang (CN); Heng Pan, Lianyungang (CN); Zhuangzhuang Dong, Lianyungang (CN); Pengfei Zhang, Lianyungang (CN); Bin Lin, Lianyungang (CN); Ming Liu, Lianyungang (CN); Zhengdi Yang, Lianyungang (CN); Heng Gao, Lianyungang (CN); Tao Liu, Lianyungang (CN); Yongkang Shuai, Lianyungang (CN)

(73) Assignee: JIANGSU NUCLEAR POWER CORPORATION, Lianyungang (CN)

( * ) Notice: Subject to any disclaimer, the term of this patent is extended or adjusted under 35 U.S.C. 154(b) by 0 days.

(21) Appl. No.: 18/988,121

(22) Filed: Dec. 19, 2024

Related U.S. Application Data

(63) Continuation of application No. PCT/CN2024/075656, filed on Feb. 4, 2024.

(30) Foreign Application Priority Data

Oct. 7, 2023 (CN) .......................... 202311287667.X

(51) Int. Cl.
*G01C 9/02* (2006.01)
*G21C 17/00* (2006.01)

(52) U.S. Cl.
CPC ............... *G01C 9/02* (2013.01); *G21C 17/00* (2013.01)

(58) Field of Classification Search
CPC .................................. G01C 9/02; G21C 17/00
USPC ......................................................... 73/432.1
See application file for complete search history.

(56) References Cited

FOREIGN PATENT DOCUMENTS

| JP | 05297183 A | * | 11/1993 |
| JP | 2002039735 A | * | 2/2002 |
| JP | 2002243885 A | * | 7/2002 |

OTHER PUBLICATIONS

Translation of JP-2002243885-A (Year: 2002).*
Translation of JP-2002039735-A (Year: 2002).*
Translation of JP-05297183-A (Year: 1993).*

* cited by examiner

*Primary Examiner* — Nathaniel T Woodward
(74) *Attorney, Agent, or Firm* — LOZA & LOZA, LLP; Michael F. Fedrick

(57) ABSTRACT

The present disclosure provides a device and a method for measuring levelness of a top cover of a reactor pressure vessel. The device includes a mounting and fixing mechanism, an inclination sensor mounting base, and an inclination sensor. The mounting and fixing mechanism includes a mounting bottom plate, and a fixing mechanism disposed on the mounting bottom plate. The inclination sensor mounting base includes a bearing plate located on the mounting bottom plate, and a portal frame disposed on the bearing plate and having a top surface. The inclination sensor is mounted on a sensor mounting surface of the bearing plate and located in the portal frame, and configured to obtain levelness of the sealing surface of the top cover by measuring levelness of the sensor mounting surface of the bearing plate.

19 Claims, 5 Drawing Sheets

DEVICE AND METHOD FOR MEASURING LEVELNESS OF TOP COVER OF REACTOR PRESSURE VESSEL

CROSS-REFERENCE TO RELATED APPLICATION

The present disclosure is a continuation of International Patent Application No. PCT/CN2024/075656 filed on Feb. 4, 2024, which claims priority to Chinese Patent Application No. 202311287667.X, entitled "DEVICE AND METHOD FOR MEASURING LEVELNESS OF TOP COVER OF REACTOR PRESSURE VESSEL", and filed on Oct. 7, 2023.

TECHNICAL FIELD

This disclosure belongs to the technical field of measuring levelness of a reactor pressure vessel top cover, and in particular relates to a device and a method for measuring levelness of a top cover of a reactor pressure vessel.

BACKGROUND

A reactor pressure vessel top cover is one of key equipment of a nuclear island, and is an important component of a pressure boundary of a primary circuit system. A pressure vessel of a pressurized water reactor includes a cylinder and a top cover. The cylinder and the top cover are tightly pressed by a sealing ring and a sealing surface to form a primary circuit safety barrier. A lifting off and reassembly operation of the top cover is one of key operations in a periodic refueling and overhaul process. According to a reassembly procedure, levelness of the sealing surface of the top cover needs to reach 0.25 mm/m to ensure that the sealing ring or the sealing surface is not damaged during an assembling process of the top cover and the cylinder, thereby ensuring that the primary circuit seal is effective. However, the top cover has a diameter of about 4 m and a weight of about 100 t, and a storage space of the top cover at a location where the top cover is leveled is high in dose and narrow in space. Therefore, it is very important and difficult to measure the levelness of the top cover.

Currently, a top cover leveling operation generally adopts a leveling instrument or a total station for measurement, and adjusts a top cover lifting sling according to the measurement result. This process requires manual visual reading and repeated multi-point measurement, and is greatly affected by levelness of a floor in the storage space of the top cover, so that it is not only inefficient and time-consuming, but also requires more workers on the site, which increases a collective radiation dose of workers. There are obvious shortcomings in measurement efficiency of this method. A patent disclosure (Patent Publication No. CN114093538A) entitled "DEVICE AND METHOD FOR MEASURING AND ADJUSTING LEVELNESS OF PRESSURIZED WATER REACTOR PRESSURE VESSEL TOP COVER" provides a method for measuring levelness using a laser leveling instrument and a mobile measurement terminal, although the method has advantages of automatic reading and directional measurement, in the actual application, defects may present that a local point cannot be measured due to shielding of a laser measurement path, a measurement error is large due to a long-distance laser beam having a large linewidth, and the like.

SUMMARY

In view of this, embodiments of this disclosure are dedicated to providing a device and a method for measuring levelness of a top cover of a reactor pressure vessel, to solve problems existing in existing levelness measurement of a reactor pressure vessel top cover, such as a large measurement error and inability to measure a local point.

A first aspect of this disclosure provides a device for measuring levelness of a top cover of a reactor pressure vessel. The device includes a mounting and fixing mechanism, an inclination sensor mounting base, and an inclination sensor. The mounting and fixing mechanism includes a mounting bottom plate, and a fixing mechanism disposed on the mounting bottom plate, and the fixing mechanism is configured to be fixed to a lower end face of the top cover. The inclination sensor mounting base includes a bearing plate and a portal frame disposed on the bearing plate. The bearing plate is disposed on the mounting bottom plate, and a top surface of the portal frame is attached to a sealing surface of the top cover. The inclination sensor is mounted on a sensor mounting surface of the bearing plate and located in the portal frame. The inclination sensor is configured to obtain levelness of the sealing surface of the top cover by measuring levelness of the sensor mounting surface of the bearing plate. The sensor mounting surface of the bearing plate is parallel to the sealing surface of the top cover.

According to the above scheme, the top surface of the portal frame in the device is attached to the sealing surface of the top cover, and the sensor mounting surface of the bearing plate is parallel to the sealing surface of the top cover, so that after the top surface of the portal frame is completely attached to the sealing surface of the top cover, the levelness of the sealing surface of the top cover is consistent with the levelness of the sensor mounting surface. Therefore, without turning the inclination sensor upside down, the levelness of the sealing surface of the top cover can be indirectly obtained by using the levelness of the sensor mounting surface of the bearing plate of the inclination sensor. Thus, a problem that the inclination sensor cannot directly measure the sealing surface of the top cover can be solved, and it is helpful for workers to automatically obtain levelness data of the whole top cover in real time, making a measurement result more intuitive, thereby a large measurement error caused by manual visual reading is avoided. In addition, the number of workers required for on-site operations is reduced, and the personnel cost is reduced, thereby avoiding defects that a local point cannot be measured due to shielding of a laser measurement path, a measurement error is large due to a long-distance laser beam having a large linewidth, and the like.

In a specific implementation of this disclosure, the device further includes an adaptive attaching mechanism, and the adaptive attaching mechanism mounted on the mounting bottom plate. The bearing plate is mounted on the adaptive attaching mechanism.

In a specific implementation of this disclosure, the adaptive attaching mechanism includes a plurality of spring groups, a plurality of adjusting shims, and a gland. The plurality of adjusting shims are respectively mounted in a plurality of grooves of the mounting bottom plate. The plurality of spring groups are respectively located on the plurality of adjusting shims. The gland is fixedly connected to the mounting bottom plate through a flange bolt and fixes the plurality of spring groups.

In a specific implementation of this disclosure, a depth of each of the grooves is greater than a thickness of each of the adjusting shims.

In a specific implementation of this disclosure, the fixing mechanism includes a supporting member, a magnetic base, a connecting column, and an adjusting nut. The supporting member is disposed on the mounting bottom plate. One end of the connecting column is connected to a threaded hole in the magnetic base through an external thread. The other end of the connecting column is fixedly locked to the supporting member through the adjusting nut. The magnetic base is configured to be fixed to the lower end face of the top cover in a magnetic attraction manner.

In a specific implementation of this disclosure, the fixing mechanism further includes a positioning block, and the positioning block disposed on an outer side of the magnetic base. The positioning block is configured to position the magnetic base in a fixed position with the top cover.

In a specific implementation of this disclosure, the positioning block includes a supporting platform, and at least one positioning column disposed on the supporting platform. The positioning column is configured to abut against a side wall of the top cover.

In a specific implementation of this disclosure, the portal frame includes two stand frames and a cross beam mounted between the two stand frames. An orthographic projection of an end of each of the stand frames facing the mounting bottom plate on the mounting bottom plate is within an orthographic projection of an end of each of the stand frames away from the mounting bottom plate on the mounting bottom plate.

In a specific implementation of this disclosure, the inclination sensor includes a wireless module configured to remotely wirelessly transmit levelness data, and a battery module configured to supply power to the wireless module.

A second aspect of this disclosure provides a method for measuring levelness of a top cover of a reactor pressure vessel. The method includes: fixedly mounting the device for measuring levelness of a top cover of a reactor pressure vessel according to the first aspect of this disclosure with the top cover; measuring levelness of the sensor mounting surface of the bearing plate in the device using the inclination sensor in the device; and determining levelness of the sealing surface of the top cover according to the levelness of the sensor mounting surface of the bearing plate.

DETAILED DESCRIPTION OF EMBODIMENTS

After careful study, it was found that an inclination sensor has replaced a bubble level and is widely used in levelness measurement of electromechanical equipment, vehicles, buildings, or the like, due to its advantages of high measurement accuracy, simple reading of an indication value, and the like. However, the inclination sensor cannot be used currently to measure levelness of a top cover due to limitations such as its inability to measure upside down and a requirement of tight attachment.

In order to solve at least one of the above problems, embodiments of this disclosure provide a device and a method for measuring levelness of a top cover of a reactor pressure vessel. The technical solutions of the embodiments of this disclosure will be clearly and completely described below with reference to the accompanying drawings of the embodiments of this disclosure. Obviously, the described embodiments are some, not all, of the embodiments of this disclosure. Based on the embodiments of this disclosure, all other embodiments obtained by those having ordinary skills in the art without inventive work fall within the protection scope of this disclosure.

Figure 1:
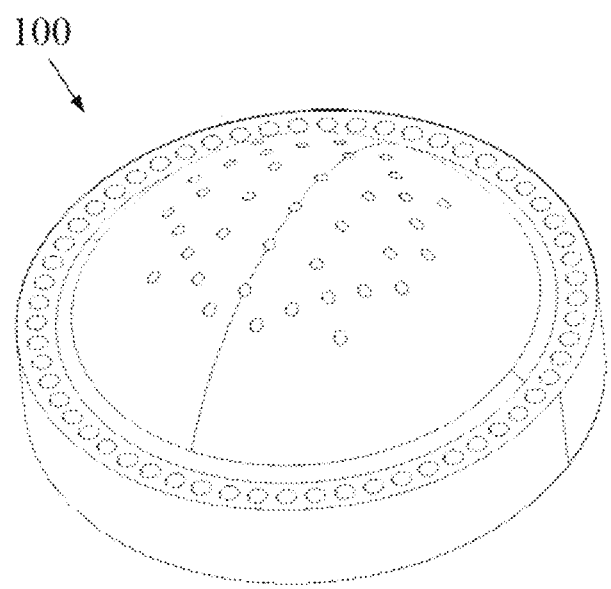
FIG. 1 is a schematic structural diagram of a top cover of a reactor pressure vessel.
Figure 2:
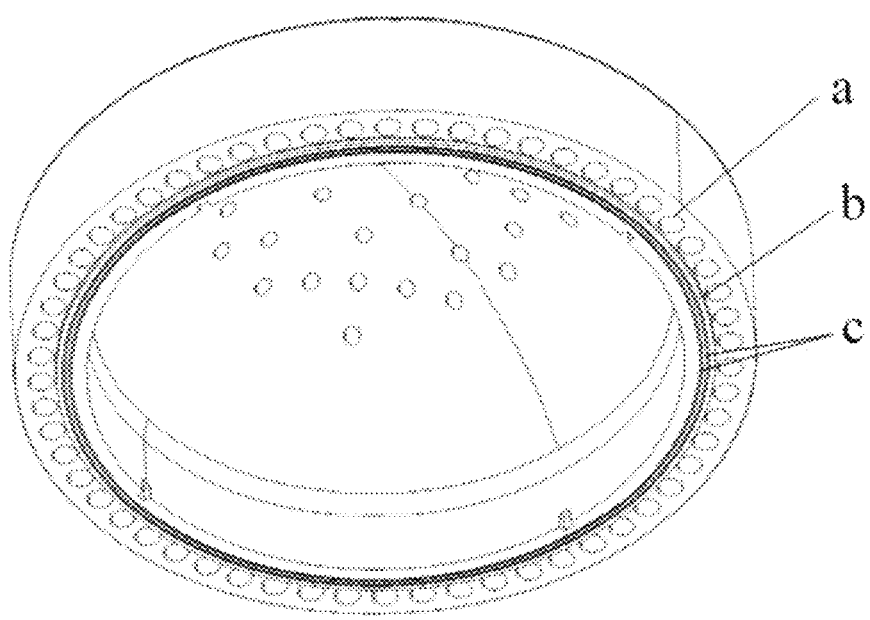
FIG. 2 is a schematic structural diagram of a top cover of a reactor pressure vessel in top view.

FIG. 1 is a schematic structural diagram of a top cover of a reactor pressure vessel. FIG. 2 is a schematic structural diagram of a top cover of a reactor pressure vessel in top view. As shown in FIG. 1 and FIG. 2, a top cover of a reactor pressure vessel 100 may be a cylindrical cylinder with a weight of about 100 t, and the top cover 100 is stored forward in a storage space of the top cover 100, a sealing surface of the top cover 100 is disposed on a bottom end face, and a structure of the top cover 100 has a bolt hole end face a, a flange sealing surface b, and a C-shaped ring sealing groove c. A precondition for hoisting the top cover 100 is usually that levelness of the flange sealing surface b reaches 0.25 mm/m. The flange sealing surface b is hereinafter referred to collectively as the sealing surface b of the top cover 100.

Figure 3:
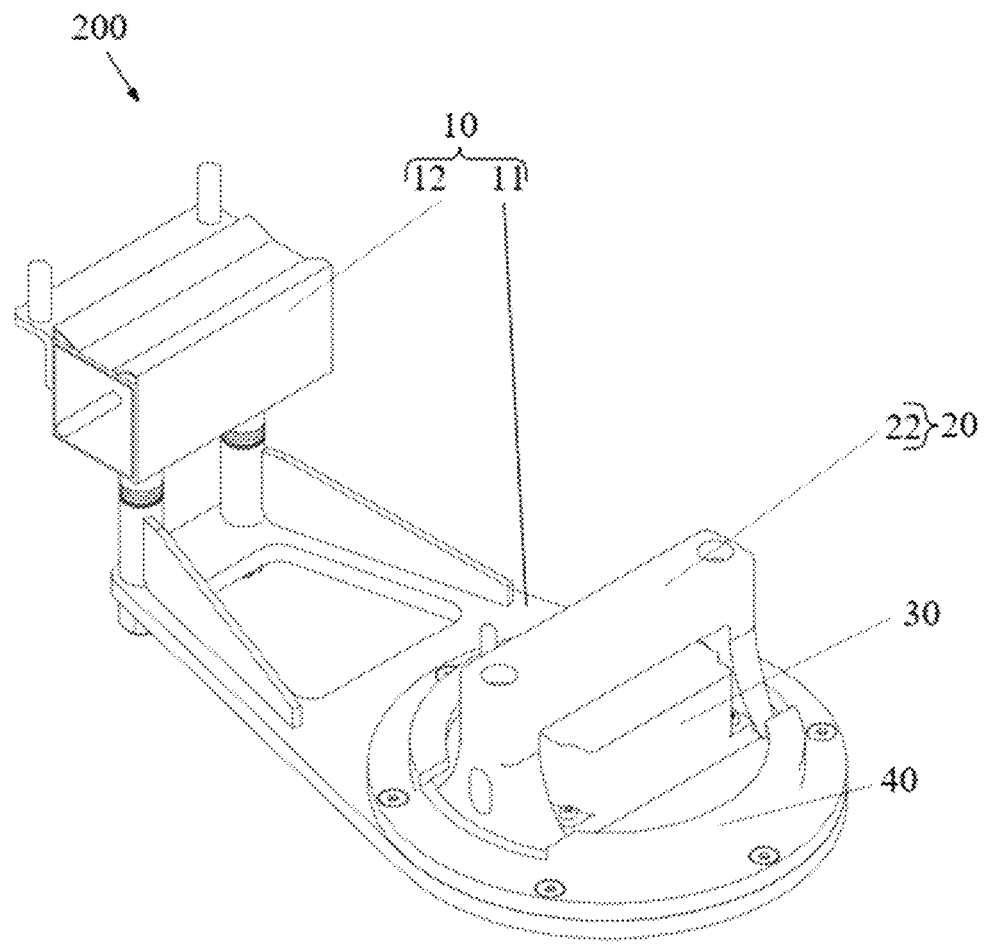
FIG. 3 is a schematic structural diagram of a device for measuring levelness of a top cover of a reactor pressure vessel according to an embodiment of this disclosure.
Figure 4:
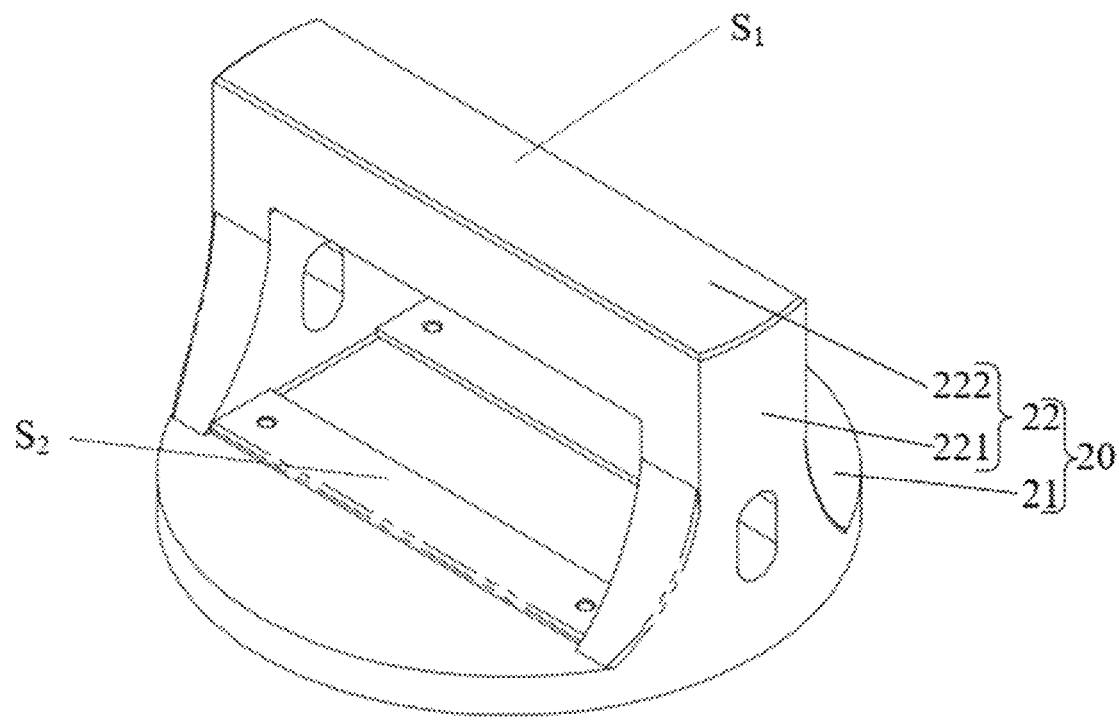
FIG. 4 is a schematic structural diagram of an inclination sensor mounting base in the device according to the embodiment shown in FIG. 3.
Figure 5:
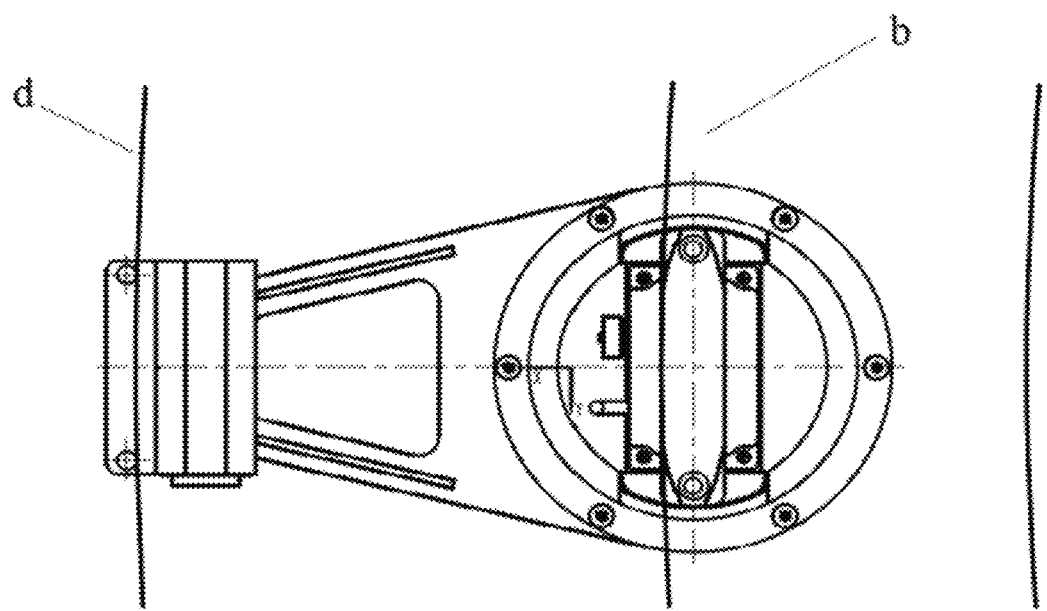
FIG. 5 is a schematic diagram of the device according to the embodiment shown in FIG. 3 in top view.
Figure 6:
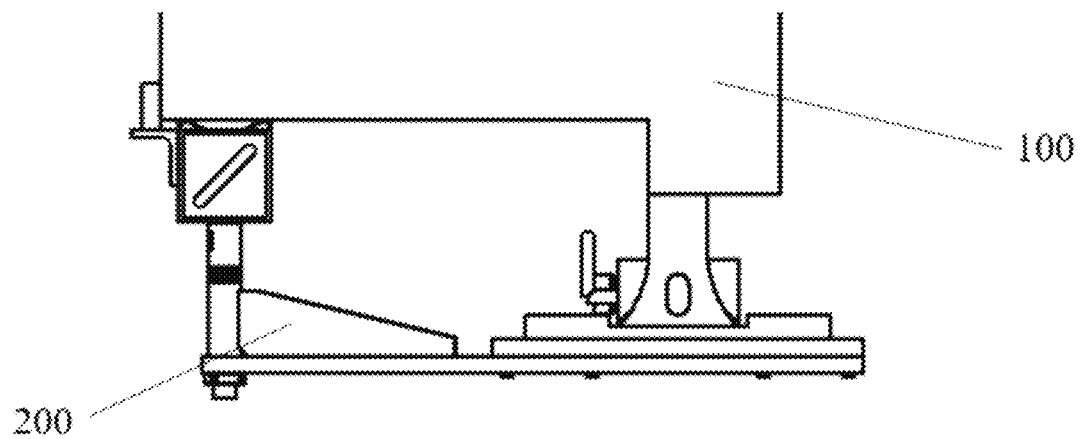
FIG. 6 is a schematic structural diagram in which the device for measuring levelness of a top cover of a reactor pressure vessel is correspondingly attached to the top cover according to the embodiment of this disclosure.

FIG. 3 is a schematic structural diagram of a device for measuring levelness of a top cover of a reactor pressure vessel according to an embodiment of this disclosure. FIG. 4 is a schematic structural diagram of an inclination sensor mounting base in the device according to the embodiment shown in FIG. 3. FIG. 5 is a schematic diagram of the device according to the embodiment shown in FIG. 3 in top view. FIG. 6 is a schematic structural diagram in which the device for measuring levelness of a top cover of a reactor pressure vessel is correspondingly attached to the top cover according to the embodiment of this disclosure.

As shown in FIG. 3 to FIG. 6, a device 200 for measuring levelness of a top cover of a reactor pressure vessel includes a mounting and fixing mechanism 10, an inclination sensor mounting base 20, and an inclination sensor 30. The mounting and fixing mechanism 10 includes a mounting bottom plate 11 and a fixing mechanism 12, and the fixing mechanism 12 is disposed on the mounting bottom plate 11. The fixing mechanism 12 is configured to be fixed to a lower end face of the top cover 100. The inclination sensor mounting base 20 includes a bearing plate 21 and a portal frame 22 disposed on the bearing plate 21. The bearing plate 21 is disposed on the mounting bottom plate 11. A top surface S1 of the portal frame 22 is attached to the sealing surface b of the top cover 100. The inclination sensor 30 is mounted on a sensor mounting surface S2 of the bearing plate 21 and is located within the portal frame 22. The inclination sensor 30 is configured to obtain the levelness of the sealing surface of the top cover 100 by measuring levelness of the sensor mounting surface of the bearing plate 21. The sensor mounting surface of the bearing plate 21 is parallel to the sealing surface of the top cover 100. In this way, the top surface of the portal frame 22 in the device 200 is attached to the sealing surface of the top cover 100, and the sensor mounting surface of the bearing plate 21 is parallel to the sealing surface of the top cover 100, so that after the top surface S1 of the portal frame 22 is completely attached to the sealing surface of the top cover 100, the levelness of the sealing surface of the top cover 100 is consistent with the levelness of the sensor mounting surface S2. Therefore, without turning the inclination sensor 30 upside down, the levelness of the sealing surface of the top cover 100 can be indirectly obtained by using the levelness of the sensor mounting surface of the bearing plate 21 of the inclination sensor 30. Thus, a problem that the inclination sensor 30 cannot directly measure the sealing surface of the top cover 100 can be solved, and it is helpful for workers to automatically obtain levelness data of the whole top cover 100 in real time, making a measurement result more intuitive, thereby avoiding a large measurement error caused by manual visual reading. In addition, the number of workers required for on-site operations is reduced, and the personnel cost is reduced, thereby avoiding defects that a local point cannot be measured due to shielding of a laser measurement path, a measurement error is large due to a long-distance laser beam having a large linewidth, and the like. In addition, the device 200 is attached to the sealing surface of the top cover 100 via the portal frame 22 of the inclination sensor mounting base 20, and the inclination sensor 30 is mounted forward on the bearing plate 21 of the inclination sensor mounting base 20, so that the mounting of the device 200 is relatively convenient, fast, and stable, the device 200 is mounted in place once and does not require manual adjustment, and continuous measurement can be performed in a leveling operation process of the top cover 100. The device 200 occupies a small space and is light in weight, which can effectively save an operation space. In addition, the worker can use the obtained levelness data of the whole top cover 100 as a data reference for the leveling operation of the top cover 100, and automatically calculate an adjustment amount of a lifting appliance and provide an adjustment scheme using the inclination sensor 30 in combination with a spatial trigonometric function. Therefore, efficiency of the leveling operation and equipment reliability are improved, and an experience requirement of the worker for the leveling operation is reduced, and an operation time and a personnel irradiation dose are reduced.

It should be noted that the device 200 realizes fast and efficient leveling according to the levelness measurement of the top cover 100 and the calculation of a relative height difference of lifting points of the top cover 100. The basic idea is such that based on a spatial geometric relationship between the levelness of the top cover 100 and three lifting points of the top cover, which is converted to calculate a height difference of the lifting points of the top cover 100 relative to the same datum plane, and then the number of rotations of a boom assembly is output according to the height difference, and the worker can repeatedly fine adjust according to the leveling scheme until reaching the standard.

The levelness of the sensor mounting surface S2 of the bearing plate 21 can directly reflect the levelness of the sealing surface of the top cover 100. The sensor mounting surface S2 is used for forward mounting of the inclination sensor 30. The sensor mounting surface S2, the top surface S1 of the portal frame 22, and the sealing surface of the top cover 100 are parallel to each other, for example, parallel in height.

The inclination sensor 30 may be selected according to actual requirements, as long as the measurement requirement of the levelness of the sealing surface of the top cover 100 can be satisfied. On this basis, designs such as structure setting and output parameter setting of the inclination sensor 30 are not specifically limited in the embodiments of the present disclosure. For example, in some embodiments, the inclination sensor 30 may support outputting levelness measurement values in various units, such as mm/m and °, so as to facilitate understanding and selection by the worker. For example, in some embodiments, measurement accuracy of the inclination sensor 30 may be better than 0.001°, and a measurement range is ≥±5°. In this way, since the measurement accuracy of the inclination sensor 30 is high, it is conducive to accurately measuring the levelness of the top surface of the portal frame 22 by using the device 200, which is conducive to improving measurement accuracy of the levelness of the sealing surface of the top cover 100.

A material of a position where the inclination sensor mounting base 20 is attached to the sealing surface of the top cover 100 may be set according to actual requirements, as long as the sealing surface of the top cover 100 is not damaged. On this basis, the material of the position where the inclination sensor mounting base 20 is attached to the sealing surface of the top cover 100 is not specifically limited in the embodiments of the present disclosure. For example, in some embodiments, the material of the position where the inclination sensor mounting base 20 is attached to the sealing surface of the top cover 100 may be a high-strength non-metallic material, such as polyetheretherketone (PEEK), so that high accuracy can be ensured without causing damage to the sealing surface of the top cover 100.

In the device 200 according to at least one embodiment of the present disclosure, as shown in FIG. 3, the device 200 further includes an adaptive attaching mechanism 40. The adaptive attaching mechanism 40 is mounted on the mounting bottom plate 11. The bearing plate 21 is mounted on the adaptive attaching mechanism 40. In this way, by adding the adaptive attaching mechanism 40, the adaptive attaching mechanism 40 can be used to enable the inclination sensor mounting base 20 to adaptively and quickly attach when the inclination sensor mounting base 20 is upwardly attached to the sealing surface of the top cover 100. A contact surface between the inclination sensor mounting base 20 and the top cover 100 can achieve a better attaching effect without adjusting the inclination sensor mounting base 20 for multiple times, thereby improving working efficiency and ensuring accuracy of a measurement result of the inclination sensor 30.

In the device 200 according to at least one embodiment of this disclosure, as shown in FIG. 4, the portal frame 22 includes two stand frames 221 and a cross beam 222 mounted between the two stand frames 221. An orthographic projection of an end of each of the stand frames 221 facing the mounting bottom plate 11 on the mounting bottom plate 11 is located within an orthographic projection of an end of each of the stand frames 221 away from the mounting bottom plate 11 on the mounting bottom plate 11. In this way, by arranging the orthographic projection of the end of each of the stand frames 221 facing the mounting bottom plate 11 on the mounting bottom plate 11 to be within the orthographic projection of the end of each of the stand frames 221 away from the mounting bottom plate 11 on the mounting bottom plate 11, the stand frames 221 has a structure that is narrow at a top and wide at a bottom, which is conducive to improving stability of the stand frame 221.

In the device 200 according to at least one embodiment of this disclosure, the inclination sensor 30 includes a wireless module and a battery module. The wireless module is configured to remotely wirelessly transmit levelness data.

The battery module is configured to supply power to the wireless module. In this way, the worker can directly collect data via remote wireless connection by using a terminal such as a mobile phone, a tablet, or a computer, thereby avoiding inconvenience caused by a cable during on-site use, and further significantly reducing a radiation dose of on-site workers. In addition, the battery module is used for independent power supply, which facilitates an on-site operation.

Figure 7:
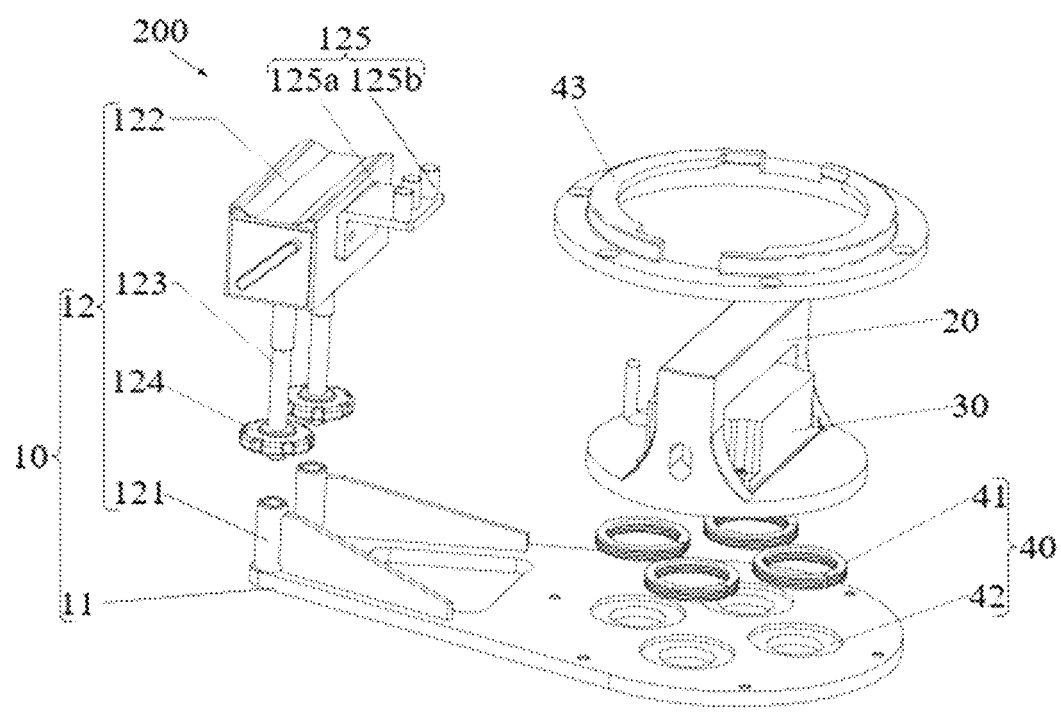
FIG. 7 is an explosion schematic diagram of a device for measuring levelness of a top cover of a reactor pressure vessel according to an embodiment of this disclosure.

FIG. 7 is an explosion schematic diagram of a device for measuring the levelness of a top cover of a reactor pressure vessel according to an embodiment of this disclosure. The embodiment shown in FIG. 7 is a modification of the embodiment shown in FIG. 3. As shown in FIG. 7, a difference from the embodiment shown in FIG. 3 is that the adaptive attaching mechanism 40 includes a plurality of spring groups 41, a plurality of adjusting shims 42, and a gland 43. The plurality of adjusting shims 42 are respectively mounted in a plurality of grooves of the mounting bottom plate 11. The plurality of spring groups 41 are respectively located on the plurality of adjusting shims 42. The gland 43 is fixedly connected to the mounting bottom plate 11 through a flange bolt and fixes the plurality of spring groups 41. In this way, in the process of the inclination sensor mounting base 20 upwardly attaching to the sealing surface of the top cover 100, the spring groups 41 located below are gradually pressed, and the inclination sensor mounting base 20 can maintain a certain degree of floating under a combined action of a multi-point elastic force provided by the plurality of spring groups 41 in the adaptive attaching mechanism 40, thereby facilitating the quick and tight attachment of the inclination sensor mounting base 20 to the top cover 100, thereby reducing the mounting difficulty of the device 200. In addition, by providing the adjusting shims 42 below the spring groups 41, the adjusting shims 42 can be used to adjust a magnitude of the elastic force when the spring groups 41 are pressed, which is conducive to achieving an optimal floating support effect. By disposing the gland 43 to be fixedly connected with the mounting bottom plate 11 through the flange bolt and fixing the plurality of spring groups 41, the spring groups 41 and the inclination sensor mounting base 20 are fixed on the mounting bottom plate 11 while ensuring that the inclination sensor mounting base 20 has a sufficient floating space. In addition, the mounting bottom plate 11 is located below the spring groups 41, so that the spring group 41 and the inclination sensor mounting base 20 can be supported by using the mounting bottom plate 11, and thus the inclination sensor mounting base 20 and the sealing surface of the top cover 100 are maintained in an attached state.

In the device 200 according to at least one embodiment of this disclosure, a depth of each of the groove is greater than a thickness of each of the adjusting shim 42. In this way, by setting the depth of the groove to be greater than the thickness of the adjusting shim 42, a part of the spring group 41 can be located in the groove, and a position of the spring group 41 can be relatively fixed by using the groove.

In the device 200 according to at least one embodiment of this disclosure, the fixing mechanism 12 includes supporting members 121, a magnetic base 122, connecting columns 123, and adjusting nuts 124. The supporting member 121 is disposed on the mounting bottom plate 11. One end of the connecting column 123 is connected to a threaded hole in the magnetic base 122 through an external thread. The other end of the connecting column 123 is fixedly locked with the supporting member 121 through the adjusting nut 124. The magnetic base 122 is configured to be fixed to the lower end face of the top cover 100 in a magnetic attraction manner. In this way, the fixing mechanism 12 can be quickly fixed on the lower end face of the top cover 100 in the magnetic attraction manner by using the magnetic base 122. Since a magnetic attraction effect of the magnetic base 122 is good, stable adsorption can be achieved during a normal lifting process of the top cover 100, thereby further ensuring accuracy of a levelness measurement result of the device 200.

It should be noted that the supporting member 121 can slide on the connecting column 123 through a sleeve. The supporting member 121 may be a part of the fixing mechanism 12, or may be a part that is independent of the fixing mechanism 12. For example, the supporting member 121 may be a part fixedly connected to the mounting bottom plate 11.

In the device 200 according to at least one embodiment of the present disclosure, the fixing mechanism 12 further includes a positioning block 125. The positioning block 125 is disposed on a side surface of the magnetic base 122. The positioning block 125 is configured to position the magnetic base 122 in a fixed position with the top cover 100. In this way, by adding the positioning block 125, a relative position of the magnetic base 122 and the top cover 100 can be accurately positioned by using the positioning block 125, thereby further ensuring the accuracy of the levelness measurement result of the device 200.

In the device 200 according to at least one embodiment of this disclosure, the positioning block 125 includes a supporting platform 125a and at least one positioning column 125b disposed on the supporting platform 125a. The positioning column 125b is configured to abut against a side wall d of the top cover 100. In this way, by the contact between the at least one positioning column 125b and the side wall d of the top cover 100, a relative position of the inclination sensor 30 and the top cover 100 is quickly positioned, and when the worker performs the leveling operation of the top cover 100, according to a mounting position of the inclination sensor 30 and the measurement result, a level state of the top cover 100 can be accurately determined, and a corresponding leveling operation can be performed.

It should be noted that the number of the at least one positioning column 125b may be one, two, three, or even more. In some embodiments, the number of the at least one positioning column 125b may be an even number, and the all of the at least one positioning column 125b is symmetrical along a central axis of the top cover 100, so that a measuring axis of the inclination sensor 30 always passes through a center of the top cover 100.

Figure 8:
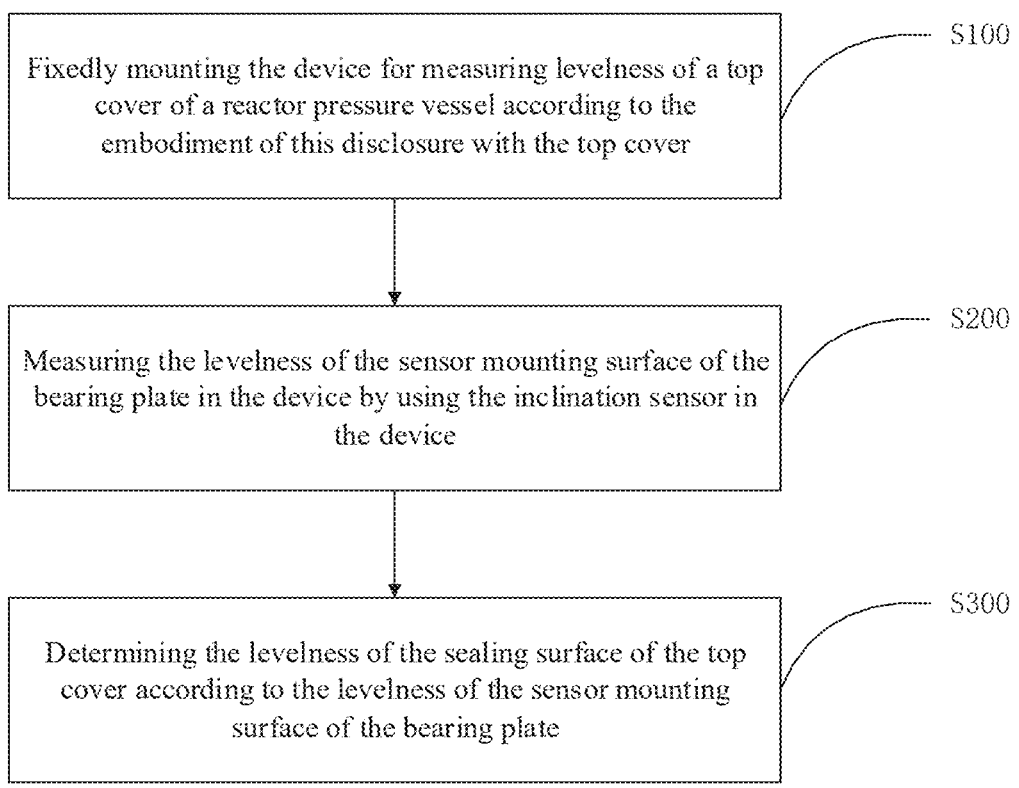
FIG. 8 is a schematic flowchart of a method for measuring levelness of a top cover of a reactor pressure vessel according to an embodiment of this disclosure.

FIG. 8 is a schematic flowchart of a method for measuring levelness of a top cover of a reactor pressure vessel 100 according to an embodiment of this disclosure. As shown in FIG. 8, the method includes the following steps.

S100: Fixedly mounting the device for measuring levelness of a top cover of a reactor pressure vessel according to the embodiment of this disclosure with the top cover.

Specifically, the inclination sensor mounting base 20 in the device 200 is upwardly attached to the sealing surface of the top cover 100 until the inclination sensor mounting base 20 is tightly attached to the top cover 100.

S200: Measuring the levelness of the sensor mounting surface of the bearing plate in the device by using the inclination sensor in the device.

S300: Determining the levelness of the sealing surface of the top cover according to the levelness of the sensor mounting surface of the bearing plate.

It should be noted that the method for measuring levelness of a top cover of a reactor pressure vessel is a method corresponding to the device for measuring levelness of a top cover of a reactor pressure vessel in the above embodiment of this disclosure, so that a corresponding technical effect can be achieved, and the description is not to be repeated here.

It should also be noted that a combination manner of technical features in the embodiments of this disclosure is not limited to a combination manner described in the embodiments of this disclosure or a combination manner described in specific embodiments, and all the technical features described in this disclosure may be freely combined or incorporated in any manner unless there is a conflict with each other.

The above description is merely exemplary embodiments of the present disclosure and is not intended to limit the present disclosure, and any modifications, equivalent substitutions, and the like made within the spirit and principle of the present disclosure shall fall within the protection scope of the present disclosure.

What is claimed is:

1. A device for measuring levelness of a top cover of a reactor pressure vessel, the device comprising:
    a mounting and fixing mechanism comprising a mounting bottom plate, and a fixing mechanism disposed on the mounting bottom plate, wherein the fixing mechanism is configured to be fixed to a lower end face of the top cover;
    an inclination sensor mounting base comprising a bearing plate and a portal frame disposed on the bearing plate, wherein the bearing plate is disposed on the mounting bottom plate, and a top surface of the portal frame is attached to a sealing surface of the top cover; and
    an inclination sensor mounted on a sensor mounting surface of the bearing plate and located in the portal frame, and configured to obtain levelness of the sealing surface of the top cover by measuring levelness of the sensor mounting surface of the bearing plate, wherein the sensor mounting surface of the bearing plate is parallel to the sealing surface of the top cover.

2. The device according to claim 1, further comprising:
    an adaptive attaching mechanism mounted on the mounting bottom plate, wherein the bearing plate is mounted on the adaptive attaching mechanism.

3. The device according to claim 2, wherein the adaptive attaching mechanism comprises a plurality of spring groups, a plurality of adjusting shims, and a gland, wherein the plurality of adjusting shims are respectively mounted in a plurality of grooves of the mounting bottom plate, the plurality of spring groups are respectively located on the plurality of adjusting shims, and the gland is fixedly connected to the mounting bottom plate through a flange bolt and fixes the plurality of spring groups.

4. The device according to claim 3, wherein a depth of each of the grooves is greater than a thickness of each of the adjusting shims.

5. The device according to claim 4, wherein the fixing mechanism comprises a supporting member, a magnetic base, a connecting column, and an adjusting nut, wherein the supporting member is disposed on the mounting bottom plate, one end of the connecting column is connected to a threaded hole in the magnetic base through an external thread, the other end of the connecting column is fixedly locked to the supporting member through the adjusting nut, and the magnetic base is configured to be fixed to the lower end face of the top cover in a magnetic attraction manner.

6. The device according to claim 4, wherein the portal frame comprises two stand frames and a cross beam mounted between the two stand frames, wherein an orthographic projection of an end of each of the stand frames facing the mounting bottom plate on the mounting bottom plate is within an orthographic projection of an end of each of the stand frames away from the mounting bottom plate on the mounting bottom plate.

7. The device according to claim 4, wherein the inclination sensor comprises a wireless module and a battery module, wherein the wireless module is configured to remotely wirelessly transmit levelness data, and the battery module is configured to supply power to the wireless module.

8. The device according to claim 3, wherein the fixing mechanism comprises a supporting member, a magnetic base, a connecting column, and an adjusting nut, wherein the supporting member is disposed on the mounting bottom plate, one end of the connecting column is connected to a threaded hole in the magnetic base through an external thread, the other end of the connecting column is fixedly locked to the supporting member through the adjusting nut, and the magnetic base is configured to be fixed to the lower end face of the top cover in a magnetic attraction manner.

9. The device according to claim 3, wherein the portal frame comprises two stand frames and a cross beam mounted between the two stand frames, wherein an orthographic projection of an end of each of the stand frames facing the mounting bottom plate on the mounting bottom plate is within an orthographic projection of an end of each of the stand frames away from the mounting bottom plate on the mounting bottom plate.

10. The device according to claim 3, wherein the inclination sensor comprises a wireless module and a battery module, wherein the wireless module is configured to remotely wirelessly transmit levelness data, and the battery module is configured to supply power to the wireless module.

11. The device according to claim 2, wherein the fixing mechanism comprises a supporting member, a magnetic base, a connecting column, and an adjusting nut, wherein the supporting member is disposed on the mounting bottom plate, one end of the connecting column is connected to a threaded hole in the magnetic base through an external thread, the other end of the connecting column is fixedly locked to the supporting member through the adjusting nut, and the magnetic base is configured to be fixed to the lower end face of the top cover in a magnetic attraction manner.

12. The device according to claim 11, wherein the positioning block comprises a supporting platform, and at least one positioning column disposed on the supporting platform, wherein the positioning column is configured to abut against a side wall of the top cover.

13. The device according to claim 2, wherein the portal frame comprises two stand frames and a cross beam mounted between the two stand frames, wherein an orthographic projection of an end of each of the stand frames facing the mounting bottom plate on the mounting bottom plate is within an orthographic projection of an end of each of the stand frames away from the mounting bottom plate on the mounting bottom plate.

14. The device according to claim 2, wherein the inclination sensor comprises a wireless module and a battery module, wherein the wireless module is configured to remotely wirelessly transmit levelness data, and the battery module is configured to supply power to the wireless module.

15. The device according to claim 1, wherein the fixing mechanism comprises a supporting member, a magnetic base, a connecting column, and an adjusting nut, wherein the supporting member is disposed on the mounting bottom plate, one end of the connecting column is connected to a threaded hole in the magnetic base through an external thread, the other end of the connecting column is fixedly locked to the supporting member through the adjusting nut, and the magnetic base is configured to be fixed to the lower end face of the top cover in a magnetic attraction manner.

16. The device according to claim 15, wherein the fixing mechanism further comprises a positioning block, and the positioning block is disposed on an outer side of the magnetic base and configured to position the magnetic base in a fixed position with the top cover.

17. The device according to claim 1, wherein the portal frame comprises two stand frames and a cross beam mounted between the two stand frames, wherein an orthographic projection of an end of each of the stand frames facing the mounting bottom plate on the mounting bottom plate is within an orthographic projection of an end of each of the stand frames away from the mounting bottom plate on the mounting bottom plate.

18. The device according to claim 1, wherein the inclination sensor comprises a wireless module and a battery module, wherein the wireless module is configured to remotely wirelessly transmit levelness data, and the battery module is configured to supply power to the wireless module.

19. A method for measuring levelness of a top cover of a reactor pressure vessel, the method comprising:

fixedly mounting a device for measuring levelness of a top cover of a reactor pressure vessel according to claim 1 with the top cover;

measuring levelness of the sensor mounting surface of the bearing plate in the device using the inclination sensor in the device; and determining levelness of the sealing surface of the top cover according to the levelness of the sensor mounting surface of the bearing plate.

* * * * *